3,254,403
CERAMIC-METAL SEAL
Archie G. Buyers, Los Angeles, and Augustus J. Mohr, Jr., Canoga Park, Calif., assignors to Hughes Aircraft Company, Culver City, Calif., a corporation of Delaware
No Drawing. Filed Nov. 24, 1964, Ser. No. 413,650
7 Claims. (Cl. 29—472.9)

This is a continuation-in-part of application Serial No. 191,456, filed May 1, 1962, now abandoned.

This invention relates to a method of producing a bond or seal between a body of ceramic material and a body of metal, and more particularly to a method of making a hermetically tight ceramic-metal seal or joint of the type employed in electrical equipment.

The difficulty of making a strong, reliable, hermetic seal capable of withstanding vibration over a wide range of temperatures is well known in the art. Such seals are required as interelectrode seals for thermionic converters, sealing components for use in high temperature vacuum tubes, bonding heat shielding ceramics, sealing together various ceramic and metal parts used in high temperature systems, etc. Among the difficulties encountered in making a satisfactory high temperature stable ceramic-metal seal or bond are differences in thermal expansion of the ceramic and metal in terms of rate and extent, differences in crystal habit for either of the seal components, interfacial energies which prevent wetting of one component by the other, and the formation of intermediate bonding compounds whose properties are incompatible with those of the original seal components. Consequently it is very difficult to make a ceramic-metal seal or bond which will exhibit satisfactory stability at temperatures much above about 1500° K.

Accordingly, it is an important object of this invention to provide a method of making a ceramic-metal seal or bond having very high temperature stability.

Another object of the invention is to provide a method of making a high temperature stable ceramic-metal seal or bond which is suitable for use with electrical equipment such as thermionic converters, vacuum tubes, and the like.

A further object is to provide a ceramic-metal seal or bond having strength, reliability and hermetic properties both at extremely low temperatures and very high temperatures.

Additional objects of this invention will become apparent from the following description, which is given primarily for purposes of illustration, and not limitation.

Stated in general terms, the objects of this invention are attained by making a ceramic to metal seal or bond by bringing together in contact a body of stabilized zirconia-containing ceramic and a body of pure tantalum, or tantalum base refractory metal, in an inert atmosphere, or vacuum, which is defined herein as an inert atmosphere, and raising the temperature of the bodies in the zone of contact to a temperature at which the bodies seal or bond to each other.

The stabilized zirconia-containing ceramic employed in making the seals of the invention can be made by adding small amounts of various oxides, including calcium oxide or magnesium oxide to pure zirconium oxide, $ZrO_2$. It also can be made from zircon, $ZrO_2 \cdot SiO_2$ or zirkite in an electric furnace. Zirkite contains from 70 to 80% $ZrO_2$, the chief impurities being silica, iron oxide, titanium oxide and aluminum oxide. Impurities in the ore are separated from $ZrO_2$ either by reducing with coke or by pulverizing and mechanically classifying the fired product. Commercial stabilized zirconia contains about 5% of CaO and has a melting point of about 2820 to 2880° K. The stabilized zirconia-containing ceramics employed should contain more than about 10 mole percent zirconia to produce the stabilized zirconia condition needed to make the ceramic-metal seal of the invention. Pure zirconia is not acceptable as it undergoes a phase change at elevated temperatures, resulting in fracture of crystal or ceramic bodies. At least 10 mole percent zirconia is included in the stabilized zirconia utilized for bonding to tantalum or refractory tantalum alloys in order to produce and maintain the cubic crystal habit of stabilized zirconia required for strong bonds which are structurally stable over wide ranges of temperature.

However, the stabilized zirconia-containing ceramic used in this invention can contain relatively large amounts of suitable metal oxides. By suitable metal oxides is meant any oxide or oxide mixture capable of containing stabilized zirconia (cubic form) which will bond with tantalum or tantalum - containing refractory metals through the formation of bonding intermediates, containing tantalum, of the type described hereinbelow. Mixtures of cubic form zirconia with up to about 23 mole percent thoria, and with from about 75 to about 90 mole percent thoria, balance zirconia, are included in this group of suitable metal oxide mixtures. Also included are ternary mixtures of metal oxides, such as mixtures of calcium oxide, beryllium oxide and zirconia in which the calcium oxide is present in amounts greater than 10 mole percent, zirconia in all compositions up to 90 mole percent, but not less than 20 mole percent, and beryllium oxide in all compositions (0–70 mole percent) necessary to balance the mole percentage composition for any given combination of calcium oxide and zirconia; all ternary mixtures of magnesium oxide, beryllium oxide and zirconia in which these three oxides can exist in solid solution, i.e., magnesia 0–10 mole percent, beryllia in compositions of 10–90 mole percent, and zirconia in compositions of not less than 10 and not more than 90 mole percent; and ternary mixtures of beryllium oxide, cerium oxide and zirconia which form a cubic mixed crystal, i.e., cerium oxide in compositions greater than 15 mole percent, beryllia in compositions of 0–65 mole percent, and zirconia in compositions of not less than 20 mole percent and not more than 85 mole percent.

The tantalum base metal, in addition to pure tantalum metal, is a refractory alloy of tantalum with metals which are compatible with tantalum. Among these alloying metals are tungsten, rhenium, niobium, molybdenum, and other high melting or refractory metals. An example of such a refractory alloy is the alloy containing 90% tantalum and 10% tungsten.

The inert atmosphere is formed by the use of an atmosphere gas such as argon, helium, or another of the inert gases or mixtures thereof, or it can be a vacuum or a partial vacuum.

The temperature of the stabilized zirconia and refractory tantalum base metal preferably is raised to a temperature above about 2200° K. and preferably not above about 2500° K. An induction heating furnace has been used for this purpose but other suitable heating means such as electrical resistance, arc, or electron beam methods can be used. The heating cycle employed consists of heating the seal components to about 2200 to about 2400° K., and then allow the bond or seal to cool to room temperature.

The following example illustrates the use of the method of the invention to produce high temperature stable seals:

*Example 1*

A stabilized zirconia ceramic consisting of 5.0 percent by weight of the mixture calcia, 0.7 percent silica, 0.3 percent titania, 0.2 percent hematite, 2.0 percent hafnia, 0.5 percent alumina and 91.3 percent zirconia was brought into contact with pure tantalum metal and placed in an induction heating furnace in an atmosphere of argon. The heating cycle employed consisted of immediate rapid heating of the seal components to about 2250° K., followed by maintaining this temperature for about five minutes to about four hours, and subsequent cooling to room temperature at any easily accomplished rate. The resulting seal was strong and was found to increase in stability with prolonged heating above 2300° K. It withstood immersion in liquid nitrogen and repeated cycling from room temperature to 2200° K. during short time intervals, of about 1 to 2 minutes. An X-ray diffraction analysis indicated that the following intermediate compounds, which produce the bond or seal, were formed: magnesium tantalate, $Mg_4Ta_2O_9$, tantalum silicide, $Ta_5Si$, and tantalum zirconate, $Ta_2Zr_6O_{17}$.

Obviously many other modifications and variations of the present invention are possible in the light of the above teachings. It is therefore to be understood that within the scope of the appended claims the invention can be practiced otherwise than as specifically described.

What is claimed is:

1. A method of making a ceramic-metal seal which comprises the steps of: bringing a body of tantalum base refractory metal into contact with a body of stabilized zirconia-containing ceramic containing more than about 10 mole percent zirconia; enclosing the contacted bodies in an inert atmosphere; and raising the temperature of the contacted bodies to a value above about 2200° K. to bond the body of tantalum base metal to the body of stabilized zirconia-containing ceramic at the zone of contact.

2. A method of making a ceramic-metal seal which comprises the steps of: bringing a body of stabilized zirconia-containing ceramic containing more than about 10 mole percent zirconia into contact with a body of tantalum base refractory alloy; enclosing the contacted bodies in an inert gas atmosphere; raising the temperature of the contacted bodies above about 2200° K. to form bonding intermediate compounds containing tantalum; and cooling the resulting bonded bodies to ambient temperatures.

3. A method of making a ceramic-metal seal which comprises the steps of: bringing a body of stabilized zirconia-containing ceramic of the group consisting of mixtures of cubic form zirconia with up to about 23 mole percent thoria based on the mixture, and mixtures of cubic form zirconia with from about 75 to about 90 mole percent thoria based on the mixture, into contact with a body of tantalum base refractory alloy; enclosing the contacted bodies in an inert gas atmosphere; raising the temperature of the contacted bodies above about 2200° K. to form bonding intermediate compounds containing tantalum; and cooling the resulting bonded bodies to ambient temperatures.

4. A method of making a ceramic-metal seal which comprises the steps of: bringing a body of stabilized zirconia-containing ceramic, consisting essentially of a ternary mixture of calcium oxide, beryllium oxide and zirconium oxide, where calcium oxide is present in more than about 5 to 10 mole percent based upon the ternary mixture and zirconium oxide is present from about 20 to about 90 mole percent based upon the ternary mixture, into contact with a body of tantalum base refractory alloy; enclosing the contacted bodies in an inert gas atmosphere; raising the temperature of the contacted bodies above about 2200° K. to form bonding intermediate compounds containing tantalum; and cooling the resulting bonded bodies to ambient temperatures.

5. A method of making a ceramic-metal seal which comprises the steps of: bringing a body of stabilized zirconia-containing ceramic, consisting essentially of a ternary mixture of magnesium oxide, beryllium oxide and zirconium oxide, where magnesium oxide is present in less than about 5 to about 10 mole percent based on the mixture and zirconium oxide is present in less than about 90 mole percent but more than about 10 mole percent based on the mixture, into contact with a body of tantalum base refractory alloy; enclosing the contacted bodies in an inert gas atmosphere; raising the temperature of the contacted bodies above about 2200° K. to form bonding intermediate compounds containing tantalum; and cooling the resulting bonded bodies to ambient temperatures.

6. A method of making a ceramic-metal seal which comprises the steps of: bringing a body of stabilized zirconia-containing ceramic, consisting essentially of a ternary mixture of beryllium oxide, cerium oxide and zirconium oxide, where cerium oxide is present in more than about 10 to 15 mole percent based on the mixture and zirconium oxide is present from about 20 to about 90 mole percent based on the mixture, into contact with a body of tantalum base refractory alloy; enclosing the contacted bodies in an inert gas atmosphere; raising the temperature of the contacted bodies above about 2200° K. to form bonding intermediate compounds containing tantalum; and cooling the resulting bonded bodies to ambient temperatures.

7. A method of making a ceramic-metal seal which comprises the steps of: bringing a body of stabilized zirconia-containing ceramic, consisting essentially of about 5 percent by weight based upon the mixture of calcium oxide, about 0.7 percent silicon dioxide, about 0.3 percent titanium dioxide, about 0.2 percent ferric oxide, about 2.0 percent hafnium dioxide, about 0.5 percent aluminum oxide and the balance zirconium oxide, into contact with a body of tantalum refractory metal; enclosing the contacted bodies in an inert gas atmosphere; raising the temperature of the contacted bodies above about 2200° K. to form bonding intermediate compounds containing tantalum; and cooling the resulting bonded bodies to ambient temperatures.

No references cited.

JOHN F. CAMPBELL, *Primary Examiner.*